(12) United States Patent
Oyama et al.

(10) Patent No.: US 7,983,418 B2
(45) Date of Patent: Jul. 19, 2011

(54) AAA SUPPORT FOR DHCP

(75) Inventors: Johnson Oyama, Mississauga (CA);
Ryoji Kato, Kanagawa (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1310 days.

(21) Appl. No.: 11/568,013

(22) PCT Filed: Dec. 10, 2004

(86) PCT No.: PCT/SE2004/001856
§ 371 (c)(1),
(2), (4) Date: Oct. 17, 2006

(87) PCT Pub. No.: WO2005/104500
PCT Pub. Date: Nov. 3, 2005

(65) Prior Publication Data
US 2008/0282325 A1    Nov. 13, 2008

(51) Int. Cl.
*H04L 29/06* (2006.01)
(52) U.S. Cl. .................................. 380/248; 726/3
(58) Field of Classification Search ........... 380/247, 380/248
See application file for complete search history.

(56) References Cited

U.S. PATENT DOCUMENTS

| | | | |
|---|---|---|---|
| 6,957,276 B1 * | 10/2005 | Bahl | 709/245 |
| 6,973,567 B1 * | 12/2005 | Riley et al. | 713/151 |
| 2001/0047484 A1 | 11/2001 | Medvinsky et al. | |
| 2002/0199104 A1 | 12/2002 | Kakemizu et al. | |
| 2004/0162892 A1 * | 8/2004 | Hsu | 709/221 |
| 2007/0101132 A1 * | 5/2007 | Cuellar et al. | 713/168 |

OTHER PUBLICATIONS

Braun T et al: "An AAA architecture extension for providing differentiated services to mobile IP users" Computers and Communications, 2001. Proceedings. Sixth IEEE Symposium on Jul. 3-5, 2001, Piscataway, NJ, USA, IEEE, Jul. 3, 2001, pp. 472-478, XP010552576 ISBN: 0-7695-1177-5 paragraph '0002!-paragraph '0004!.
Droms: "Dynamic Host Configuration Protocol", RFC2131, Mar. 1997.
Droms, et al: "Authentication for DHCP Messages", RFC 3118, Jun. 2001.
Yegin, et al: "Delayed DHCP Authentication Using EAP-based Network Access Authentication", Bootstrapping RFC 3118, Feb. 2004, <draft-yegin-eap-boot-rfc3118-00.txt>.
Tschofenig, et al: "Delayed authentication using PANA", Bootstrapping RFC 3118, Oct. 2003, <draft-tschofenig-pana-bootstrap-rfc3118-01.txt>.
Faccin, et al.: "Diameter Mobile IPv6 Application", Apr. 2003, <draft-le-aaa-diameter-mobileipv6-03.txt>.

(Continued)

*Primary Examiner* — Gilberto Barron, Jr.
*Assistant Examiner* — Virginia Ho

(57) ABSTRACT

A basic idea is to use the AAA infrastructure to assign (S3) an appropriate DHCP server to DHCP client for the DHCP service, and transferring DHCP-related information over the AAA infrastructure for authenticating (S1) and authorizing (S4) the DHCP client for DHCP service with the assigned DHCP server. Instead of the more complex DHCP server discovery process known from the prior art, the AAA infrastructure, and more particularly a suitable AAA server or equivalent AAA component, is used for assigning an appropriate DHCP server to the DHCP client. Consequently, there is no longer any mandatory dependency on the DHCP discovery-related messages. The invention preferably provides AAA protocol support for facilitating assignment of appropriate DHCP servers and providing an out-of-band key agreement protocol for DHCP clients and servers by carrying DHCP related information facilitating the bootstrapping of DHCP authentication extension (RFC3118).

7 Claims, 10 Drawing Sheets

OTHER PUBLICATIONS

Giaretta, et al: "MIPv6 Authorization and Configuration based on EAP", Feb. 2004, <draft-giaretta-mip6-authorization-eap-00.txt>.

Blunk, et al: "PPP Extensible Authentication Protocol (EAP)" RFC2284, Mar. 1998.

IEEE: IEEE Standard 802.1X, Local and metropolitan area networks—Port-Based Network Access Control.

Eronen, et al: "Diameter Extensible Authentication Protocol (EAP) Application", Feb. 16, 2004, <draft-ietf-aaa-eap-04.txt>.

Maughan, et al: "Internet Security Association and Key Management Protocol (ISAKMP)" RFC2408, Nov. 1998.

Rigney, et al: "Remote Authentication Dial in User Service (RADIUS)", RFC2865, Jun. 2000.

Rigney, et al: "RADIUS Extensions", RFC2869, Jun. 2000.

Vollbrecht, et al: "State Machines for EAP Peer and Authenticator", Oct. 2003, <draft-ietf-eap-statemachine-01.pdf>.

Grayson, et al: "EAP Authorization", Mar. 2003, <draft-grayson-eap-authorization-01.txt>.

Blunk, et al: "Extensible Authentication Protocol (EAP)", Sep. 2003, <draft-ietf-eap-rfc2284bis-06.txt>.

* cited by examiner

AAA SUPPORT FOR DHCP

TECHNICAL FIELD OF THE INVENTION

The present invention generally relates to the field of network communication, and more particularly to AAA (Authentication, Authorization, Accounting) support for DHCP (Dynamic Host Configuration Protocol).

BACKGROUND OF THE INVENTION

The DHCP protocol (RFC 2131) [1] provides a framework for providing configuration parameters to hosts on the Internet and similar networks, including mobile networks. DHCP is basically built on a client-server model, where designated DHCP server hosts allocate network addresses and deliver such configuration parameters to dynamically configured DHCP clients. A DHCP client is thus a host that uses DHCP to obtain configuration parameters such as a network address, and a DHCP server is a host that returns configuration parameters to DHCP clients. DHCP servers are normally configured by a system administrator. The basic DHCP protocol supports three mechanisms for address allocation. In automatic allocation, DHCP allocates a permanent address to a DHCP client. In dynamic allocation, an address is allocated to a client for a limited period of time (or until the client releases the address). In manual allocation, an address is allocated by the network administrator, and DHCP is simply used to convey the allocated address to the DHCP client. After obtaining parameters (e.g. TCP/IP stack parameters) via DHCP, a DHCP client should be able to exchange packets with any other host in the considered network.

In accordance with the DHCP protocol of RFC2131, a client 130 that needs DHCP configuration broadcasts a DHCP DISCOVER message. DHCP servers 125 may then each respond with a DHCP OFFER message that includes an available network address and other optional configuration parameters (FIG. 1). The client 130 thus receives DHCP OFFER messages from a number of DHCP servers 125, and chooses one of the servers to be used for the actual DHCP configuration. The client subsequently broadcasts a DHCP REQUEST message indicating the selected DHCP server. The selected server commits the configuration and finally responds with a DHCPACK message containing the configuration parameters for the requesting client. The DHCP-server discovery phase (DHCP DISCOVER and DHCP OFFER) illustrated in FIG. 1 is required to inform the DHCP client of the DHCP servers that can be of service for DHCP configuration, and is a quite cumbersome process.

Furthermore, the basic DHCP protocol (RFC2131) does not include any explicit security mechanisms and is generally considered as quite insecure.

DHCP authentication extension (RFC3118) [2] is the DHCP authentication protocol that defines how to authenticate various DHCP messages to increase the security. Unfortunately, DHCP authentication extension (RFC 3118) does not support roaming clients, and cannot be widely deployed due to lack of an out-of-band key agreement protocol for DHCP clients and servers.

To date, there have been proposals in IETF that outline how EAP-based network access authentication mechanisms can be used to establish a local trust relation and generate keys that can be used in conjunction with RFC3118.

For example, reference [3] proposes that the DHCP client gains network access by utilizing an EAP authentication method that generates session keys. As part of the network access process, the DHCP client and the authentication agent (NAS; AAA client) communicate their intention to create a DHCP security association (SA) and exchange the required parameters (e.g., nonce, key ID, etc.). The required information exchange is handled by the EAP lower-layer, which also carries EAP.

Along these lines, reference [4] proposes additional payloads that are required within PANA in order to bootstrap RFC3118. This reference [4] also proposes that a DHCP SA is generated based on the PANA SA after successful PANA authentication.

There are cases where EAP lower-layers will not be able to support the required information exchange for bootstrapping RFC3118. For example, if the EAP lower-layers are PPP, IEEE 802.1x, or legacy PANA protocols. Requiring EAP lower-layers support also means that the AAA Clients must understand RFC3118 bootstrapping requirements and must be aware of the contents of the exchanges between the DHCP client and server.

There is thus a general need for improved underlying support for Dynamic Host Configuration Protocol (DHCP) services.

SUMMARY OF THE INVENTION

The present invention overcomes these and other drawbacks of the prior art arrangements.

It is a general object of the present invention to provide improved support for DHCP service for a DHCP client such as a mobile host requiring DHCP configuration.

The solution should preferably include mechanisms that facilitate deployment of DHCP.

In particular it is desirable to provide a streamlined, yet robust solution for authentication as well as authorization of the DHCP service.

It is a special object of the invention to provide a method and a system for supporting DHCP service.

Still another object of the invention is to provide individual network components that support authentication as well as authorization of the DHCP service.

These and other objects are met by the invention as defined by the accompanying patent claims.

A basic feature of the invention is to rely on an AAA infrastructure to "bootstrap" DHCP support for a DHCP client. The idea is to use the AAA infrastructure to assign an appropriate DHCP server to the DHCP client for the DHCP service, and transferring DHCP-related information over the AAA infrastructure for authenticating and authorizing the DHCP client for DHCP service with the assigned DHCP server.

Instead of the cumbersome conventional DHCP server discovery process, the AAA infrastructure, and more particularly a suitable AAA server, is used for assigning an appropriate DHCP server to the DHCP client. Consequently, there is no longer any mandatory dependency on the DHCP discovery-related messages. The assignment is typically made either in response to a DHCP server assignment request initiated from the client host or as a network-initiated reassignment.

Furthermore, not only authentication, but also authorization of the DHCP client for the DHCP service with the assigned DHCP server is supported by using the AAA infrastructure for transfer of the required DHCP-related authentication and authorization information. DHCP bootstrapping is normally based on the establishment of a security association between the assigned DHCP server and the mobile host to secure pertinent communication for the subsequent DHCP configuration of the client host. The transfer of DHCP-related information therefore preferably involves transfer of DHCP server assignment information (such as the network address of the assigned DHCP server) and DHCP security association information to the DHCP client.

In an important exemplary scenario, the DHCP client is a mobile host roaming in a visited network. An AAA server in the visited network, a so-called AAA visited network server (AAAv), is then preferably responsible for assigning an appropriate DHCP server to the client. The DHCP server assignment may for example be based on some policy decided by the visited network operator.

It has also been recognized that there are cases where it would be beneficial to have the DHCP server located in the home network or other networks, such as for the case where the visited network does not provide DHCP server support. In cases when the DHCP server is located in the home network of the mobile host, it may be appropriate to use a so-called AAA home network server (AAAh) as a suitable AAA infrastructure component for DHCP server assignment.

In fact, with the invention the location of DHCP server can be in the home network, visited network, or even other networks.

The reliance on the AAA infrastructure offers different possibilities for bootstrapping the DHCP authentication and authorization support. For example, when the DHCP client is a mobile host roaming in a visited network, it has proven to be very beneficial to transfer DHCP-related authentication and authorization information (preferably concurrently) between the mobile host and an AAA home network server within an authentication protocol in an end-to-end procedure transparent to the visited domain. This preferably includes transparency of nodes such as access network nodes, the AAA client and the AAA server in the visited network as well as other possible intermediate AAA servers. This makes it possible to let the AAA nodes of the visited network act as mere pass-through agents; which is a considerable advantage. It will also be possible to apply prior encryption between a mobile host and AAAh since the exchanges are not visible over the air interface.

The authentication protocol may be an extended authentication protocol based on an existing protocol, or a new protocol. A possible authentication protocol to be used as a basis for bootstrapping DHCP authentication and authorization is the Extensible Authentication Protocol (EAP), creating EAP extensions while preferably keeping the EAP lower layer(s) intact. This normally means that DHCP-related information is incorporated as additional data in the EAP protocol stack, for example as EAP attributes in the EAP method layer of the EAP protocol stack or transferred in a generic container on the EAP layer or the EAP method layer.

Another way, to be used as a complement or as an alternative to the EAP extensions, would be to enhance the EAP "lower layer(s)" like creating a new or extended AAA framework protocol application such as a Diameter application adapted for DHCP or a corresponding application based on the Radius protocol.

When the DHCP server is located in the visited network, a new or extended EAP-like protocol is preferably used in combination with an enhanced AAA framework protocol application, or alternatively the enhanced AAA framework protocol application is used without any support of EAP-like extensions.

When the DHCP server is located in the home network, it is for example possible to use a new or extended authentication protocol or an enhanced AAA framework protocol application.

For example, an extended EAP or EAP-like protocol may be carried by PANA (Protocol for carrying Authentication for Network Access), PPP (Point-to-Point Protocol), IEEE 802.1X or even over GPRS/UMTS interfaces between the mobile host and an AAA client in the visited network, and by Diameter or Radius within the AAA infrastructure.

Relying on customized authentication protocols such as authentication protocol extensions like EAP extensions to carry both DHCP authentication and authorization information provides a streamlined solution, which is manageable and elegant with a minimum of backward compatibility problems.

By also including HMIPv6-related information or even MIPv6-related information in the extended authentication protocol stack or in the enhanced AAA framework protocol application it is possible to simultaneously accommodate DHCP and HMIPv6/MIPv6 authentication and authorization in the same round trip over the AAA infrastructure. It is of course possible to use such a DHCP/HMIPv6/MIPv6-enabled network and execute only DHCP authentication and authorization without the HMIPv6/MIPv6 counterpart, and vice versa, depending on the particular need of the mobile host at a specific instance. This allows a single extended authentication protocol and/or enhanced AAA framework protocol application to be flexibly used on various use case scenarios.

The invention offers the following advantages:
  AAA-based DHCP server assignment;
  Efficient bootstrapping of DHCP support;
  Efficient transfer of DHCP-related information for authorizing the DHCP service;
  Streamlined solution for DHCP authentication and authorization support based on EAP-like extension, which is manageable and elegant with a minimum of backward compatibility problems;
  Optimization of authentication and authorization in a common procedure;
  DHCP server-location not limited to visited network;
  DHCP server can be located in the home network; and
  Simultaneous accommodation of DHCP and HMIPv6/MIPv6 authentication and authorization in the same round trip.

Other advantages offered by the present invention will be appreciated upon reading of the below description of the embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS OF THE INVENTION

Figure 1:
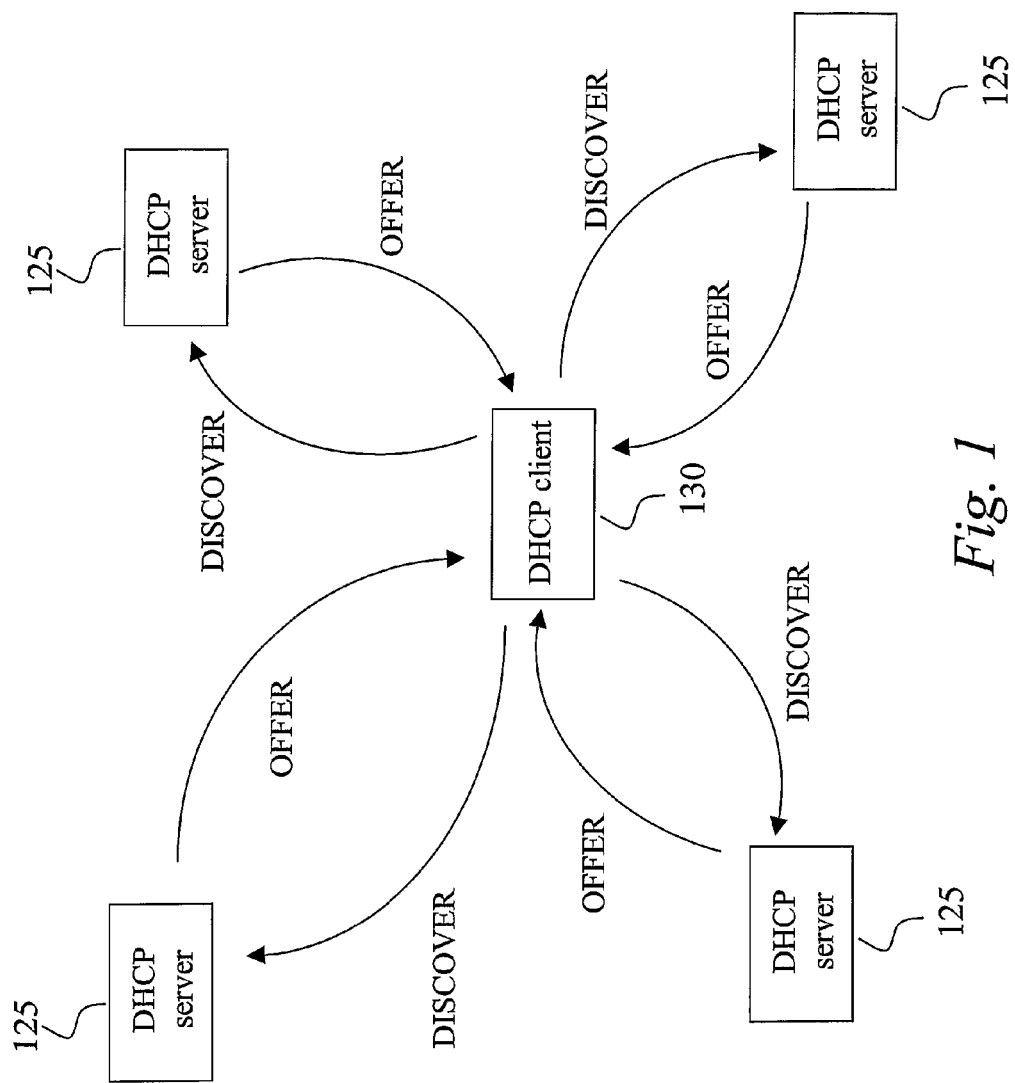
FIG. 1 is a schematic diagram illustrating the conventional DHCP discovery process.

Throughout the drawings, the same reference characters will be used for corresponding or similar elements.

A basic idea is to use the AAA infrastructure to assign an appropriate DHCP server to the DHCP client for the DHCP service, and transferring DHCP-related information over the AAA infrastructure for authenticating and authorizing the DHCP client for DHCP service with the assigned DHCP server.

Instead of the far more complex DHCP server discovery process known from the prior art, the AAA infrastructure, and more particularly a suitable AAA server or equivalent AAA component, is used for assigning an appropriate DHCP server to the DHCP client. Consequently, there is no longer any mandatory dependency on the DHCP discovery-related messages.

The DHCP client may for example be a mobile host and the invention even provides support for roaming hosts. When the mobile host is roaming in a visited network, an AAA visited network server (AAAv) is preferably responsible for assigning an appropriate DHCP server to the client. The DHCP server assignment may then for example be based on some policy decided by the visited network operator. The DHCP server selection could be based, e.g. on the current load of the available DHCP servers, the location of the mobile host and/or possibly preferences given by the mobile host.

However, there may also be cases where it would be beneficial to have the DHCP server located in the home network or other networks, such as for the case where the visited network does not provide DHCP server support. In such a case, it may be appropriate to use a so-called AAA home network server (AAAh) as a suitable AAA infrastructure component for DHCP server assignment.

In fact, with the invention the location of DHCP server can be in the home network, visited network, or even other networks.

The AAA DHCP bootstrapping is normally based on the establishment of a security association, i.e. a security relation, between the assigned DHCP server and an authenticated DHCP client (e.g. a mobile host) over the AAA infrastructure to secure subsequent communication between the DHCP server and client for the DHCP configuration of the client. The DHCP security association information and DHCP server assignment information are then transferred to the DHCP client over the AAA infrastructure to authorize the DHCP client for the DHCP configuration service. The invention preferably provides AAA protocol support for facilitating assignment of appropriate DHCP servers and/or providing an out-of-band key agreement protocol for DHCP clients and servers by carrying DHCP-related information facilitating the bootstrapping of DHCP authentication extension (RFC3118).

In the following exemplary embodiments, the DHCP client will primarily be represented by a mobile host or mobile node. However, it should be understood that the invention is not necessarily limited thereto.

Figure 2:
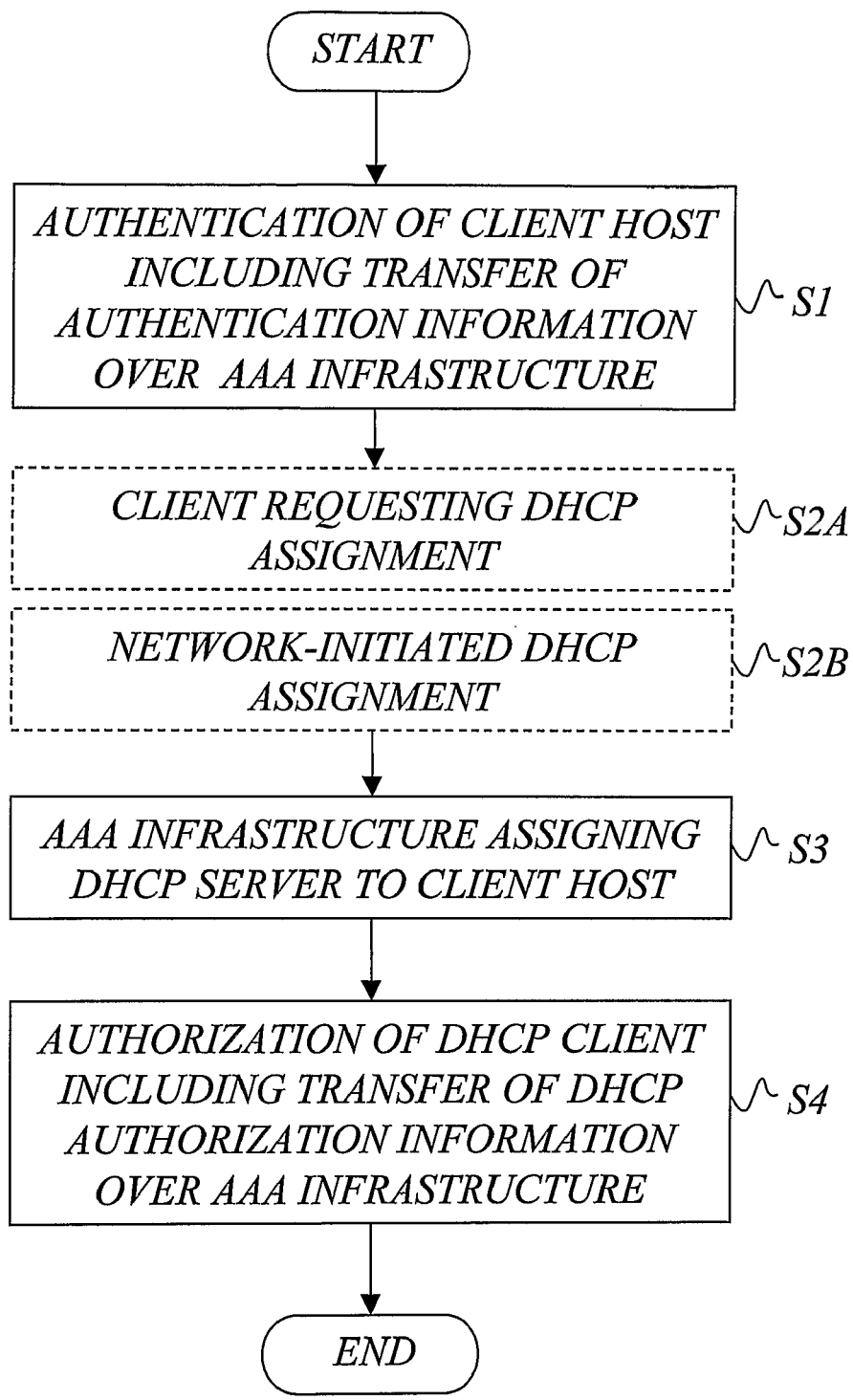
FIG. 2 is a schematic flow diagram of an illustrative example of a method for supporting DHCP service for a client host.

FIG. 2 is a schematic flow diagram of an illustrative example of a method for supporting DHCP service for a client host. In step S1, a mobile DHCP client host is authenticated by a suitable network component such as an AAA server in the home network of the mobile host, typically based on a challenge-response procedure over the AAA infrastructure. As indicated in step S2A, the DHCP client may request DHCP server assignment. This request is preferably transferred over the AAA infrastructure together with the authentication response in order to reduce the number of required round-trips. In effect, this means that the client-initiated DHCP request may be performed before the client is finally authenticated. As an alternative to a client-initiated DHCP server assignment, the assignment of DHCP server may be initiated by the network, as indicated in step S2B. In step S3, the AAA infrastructure is used for assigning a suitable DHCP server to the requesting client host. The AAA infrastructure is preferably also used for generating DHCP security association information. In step S4, the DHCP client is then authorized for the DHCP service by transferring DHCP authorization information including information on the assigned DHCP server and the DHCP security association information to the DHCP client over the AAA infrastructure. This means that the DHCP client is prepared for securely receiving a network address (e.g. an IP address) and other optional DHCP configuration parameters from the assigned DHCP server.

The term "AAA" should be taken within its general meaning of Internet drafts, RFCs and other standardization documents. Typically, the authentication and security key agreement of an AAA (Authorization, Authentication, Accounting) infrastructure is based on symmetric cryptography, implying the existence of an initial secret shared between the DHCP client (e.g. a mobile host) and the home network operator of the client or a trusted party. In some scenarios and applications, for example the accounting feature of the AAA infrastructure may be disabled or not implemented. The overall AAA infrastructure generally includes one or more AAA servers, in the home network, intermediate networks (if any) and/or the visited network, and may also include one or more AAA clients.

In general, AAA protocols such as the Diameter protocol precisely enable mobile users to roam and obtain service in networks that may not necessarily be owned by their home service provider. For Mobile IP to be deployed in commercial networks, there therefore has to be AAA support for the protocol. For the special case of Mobile IPv6 (MIPv6), an Internet draft [5] has been proposed which specifies a new application to Diameter that enables MIPv6 roaming in networks other than the network administered by the home operator. In our U.S. Provisional Patent Application 60/479, 156 filed Jun. 18, 2003 and also in the later Internet draft [6] an architecture and related protocols for performing Mobile IPv6 authorization and configuration based on an AAA infrastructure are suggested. The necessary interaction between the AAA server of the home provider and the mobile host for MIPv6 is realized using EAP (Extensible Authentication Protocol), which convey information for Mobile IPv6 negotiation together with authentication data.

Figure 3:
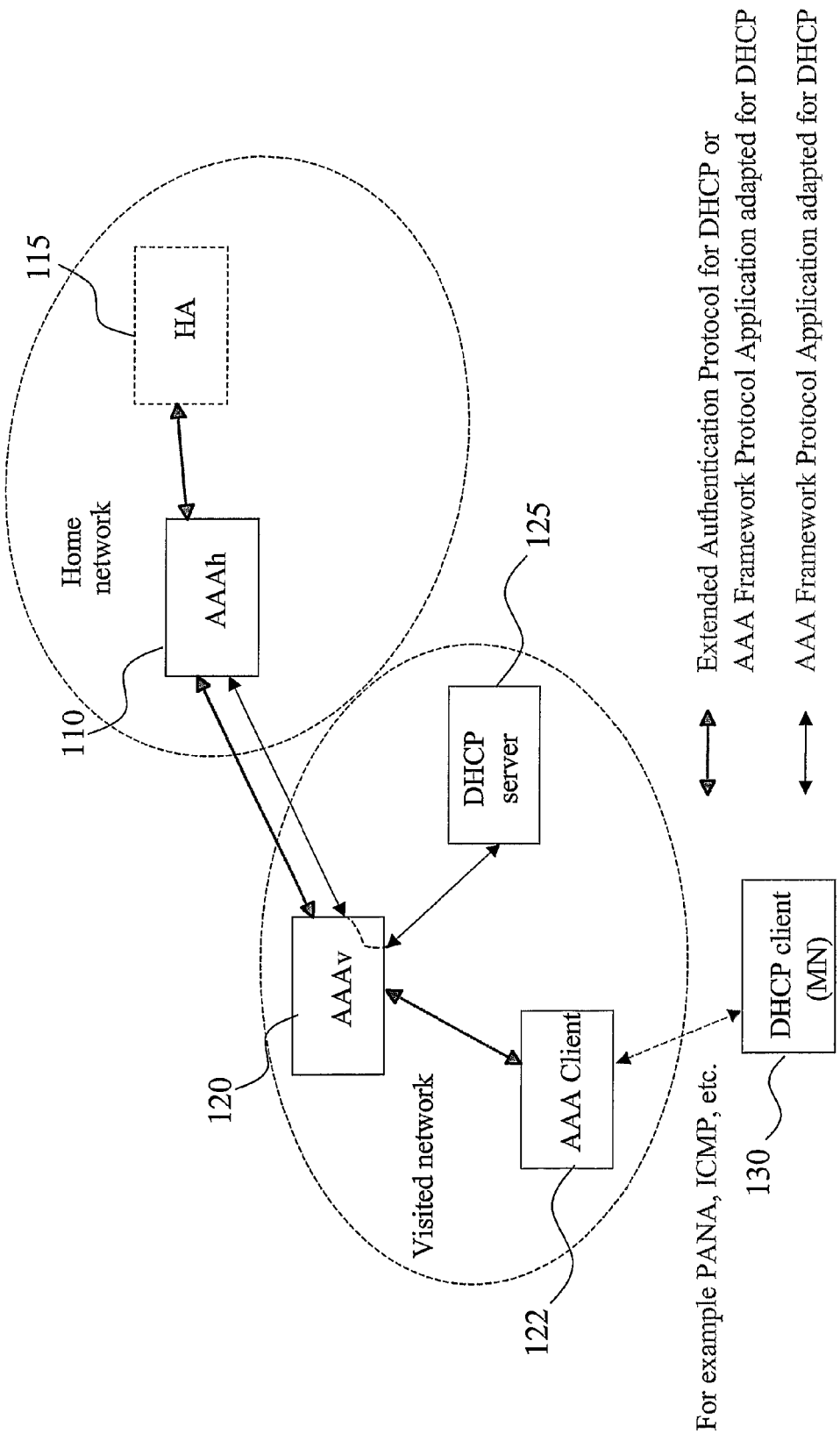
FIG. 3 is a schematic diagram illustrating a novel architecture for DHCP authentication and authorization support for a DHCP client roaming in a visited network according to an exemplary embodiment of the invention.

FIG. 3 is a schematic diagram illustrating a novel architecture for DHCP support according to an exemplary embodiment of the invention. The DHCP client in the form of a mobile host (also referred to as a mobile node MN) 130 is roaming in a visited network, and DHCP authentication and authorization is performed by using an AAA infrastructure linking the visited network and the home network of the mobile host. In this example, the AAA infrastructure basically involves an AAA home network server 110, an AAA visited network server 120 and an AAA client 122 in the visited network.

Preferably, the AAA visited network server (AAAv) 120 can be used as a suitable AAA infrastructure component for assignment of a suitable DHCP server, taking the visited operator's policy into account in the selection of DHCP server.

A main component of the AAA infrastructure is the AAAh server 110, which preferably forwards any request for DHCP server assignment from the mobile DHCP client to the AAAv server 120, and furthermore generates a security key or similar credentials for immediate or future security association between a given mobile DHCP client host 130 and an assigned DHCP server 125. The security key is then typically transferred from the AAAh 110 to the DHCP server 125 via the AAAv 120, and the DHCP server 125 preferably responds with information for finalizing the DHCP security association to the AAAh 110 via the AAAv 120. Finally, the AAAh server 110 sends the generated and collected DHCP authorization information including DHCP server address and DHCP SA information to the mobile host 130 over the AAA infrastructure. It is assumed that secure tunnels of the AAA infrastructure or other security measures such as encryption and source integrity protection are employed for transfer of sensitive information such as the security key(s).

The reliance on the AAA infrastructure offers different possibilities for bootstrapping the DHCP authentication and authorization support. For example, it is possible to provide a new extended authentication protocol, or to provide an extension to an existing authentication protocol carried over the AAA infrastructure and/or to enhance an AAA framework protocol application to carry the DHCP-related information including DHCP authorization information, as schematically indicated in FIG. 3. Preferably, the required authentication and authorization information is transferred concurrently in the same round trip.

When the DHCP client is a mobile host roaming in a visited network, the DHCP-related authentication and authorization information may for example be transferred between the mobile host and an AAA home network server within an authentication protocol in an end-to-end procedure transparent to the visited domain. This makes it possible to let the AAA nodes of the visited network act as mere pass-through agents; which is a considerable advantage.

Preferably, an extended authentication protocol such as an extended EAP (Extensible Authentication Protocol) protocol adapted for DHCP is utilized, with the addition of an enhanced AAA framework protocol application such as a DHCP Diameter or Radius Application for the interface between AAAh server and the visited network DHCP server via the AAAv server.

For example, the authentication protocol may be carried by PANA (Protocol for carrying Authentication for Network Access), PPP (Point-to-Point Protocol), IEEE 802.1x or even over GPRS/UMTS interfaces between the mobile host and the AAA client in the visited network, and by Diameter or similar AAA framework or carrier protocol within the AAA infrastructure.

Alternatively, an enhanced AAA framework protocol application such as a new or extended Diameter or Radius Application is used without the support of any EAP or EAP-like extensions. For the path between the mobile and the AAA client, the Diameter or Radius Application could for example be carried by ICMP (Internet Control Message Protocol).

For MIPv6 purposes, the MN 130 may be associated with an optional Home Agent (HA) 115, and for HMIPv6 purposes with an optional Mobility Anchor Point (not shown).

Figure 4:
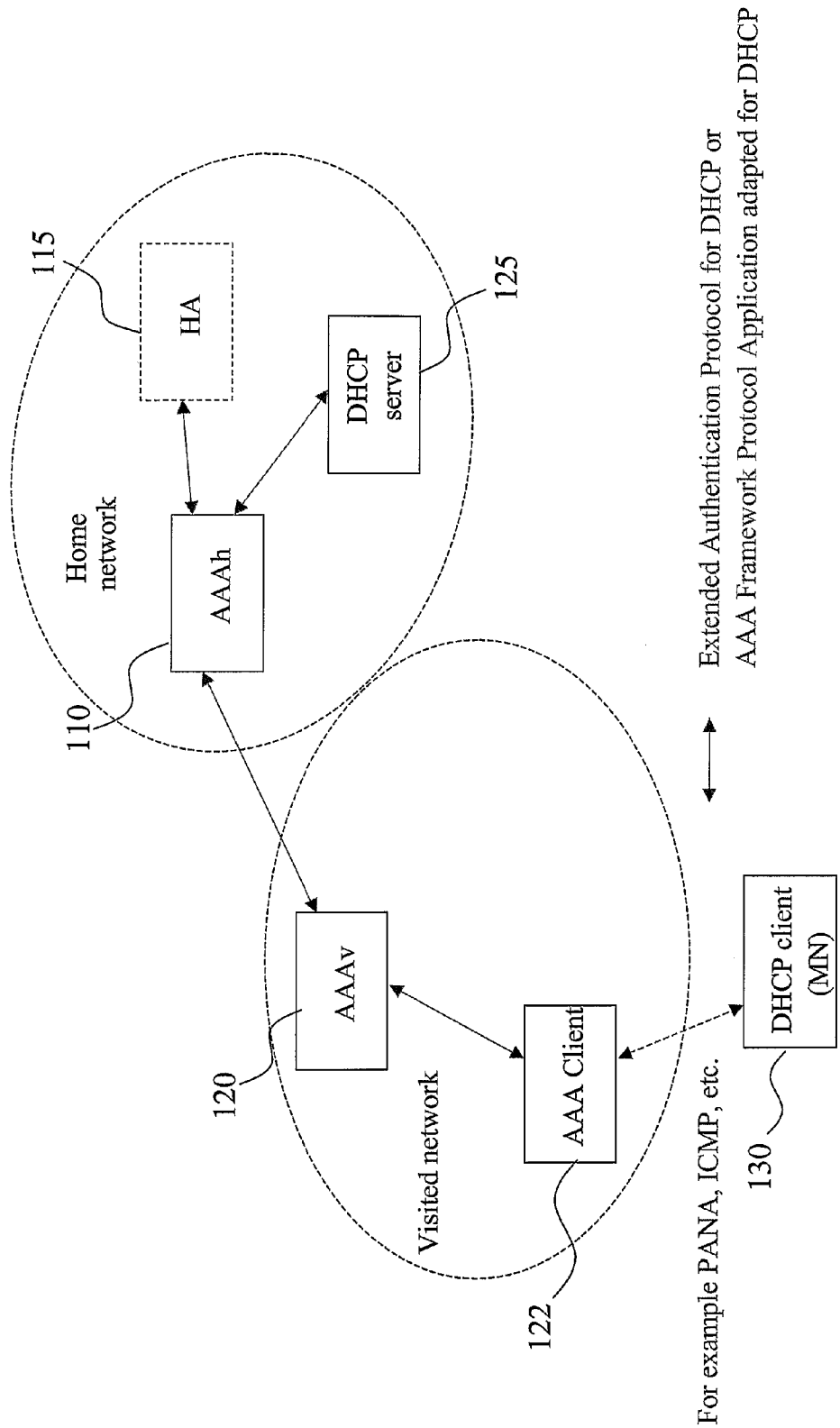
FIG. 4 is a schematic diagram illustrating a novel architecture for DHCP support for a DHCP client roaming in a visited network according to another exemplary embodiment of the invention.

It has also been recognized that there are cases where it would be beneficial to have the DHCP server located in the home network or other networks, such as for the case when the visited network does not provide DHCP server support. An exemplary architecture for DHCP support with the assigned DHCP server located in the home network is illustrated in FIG. 4.

It is here beneficial to use the AAA home network server (AAAh) 110 for DHCP server assignment. Preferably, the AAA home network server (AAAh) 110 also generates a security key or similar security parameters or credentials for security association between the mobile host and the assigned DHCP server 125 and sends said security key to the DHCP server 125. The DHCP server 125 responds with information for finalizing the security association to the AAAh 110, and the AAAh 110 subsequently sends DHCP authorization information including DHCP server address and DHCP SA information to the mobile host 130 over the AAA infrastructure.

If the DHCP server 125 is located in the home network and an extended authentication protocol such as an extended EAP (Extensible Authentication Protocol) protocol adapted for DHCP is employed, the AAAv 120 does not have to see any DHCP transactions whatsoever, and it is thus possible to have a complete "end-to-end procedure" for DHCP authentication and authorization (not only between MN and AAAh).

Alternatively, an enhanced AAA framework protocol application such as a DHCP Diameter or Radius Application can be utilized.

As should be understood, the invention has removed the limitation of the prior art that the DHCP server 125 has to be located in the visited network. Now, the location of the DHCP server can be in the home network, visited network, or even other networks.

Re-assignment of DHCP server may occur during the following exemplary cases:

Expiration of security keys between DHCP client (MN) and DHCP server—for this case, the MN may initiate DHCP re-authentication/authorization, and the network may assign a different DHCP server that is more appropriate based on, e.g., current topological location of MN.

At the request of the mobile DHCP client (MN initiated)—for this case, the MN initiates DHCP re-authentication/authorization requesting re-assignment of DHCP server.

At the request of the network (network initiated)—for the case, either the AAAh or AAAv may initiate the re-assignment of DHCP server and "pushes" this to the MN when the need arises, e.g., when the MN moves to an access router (AR) that is better covered by a new DHCP server.

With reference to FIGS. 3 and 4 again, a number of possible examples of different protocol combinations between the segments AAA Client-AAAh, and AAAh-(AAAv)-DHCP server are summarized below:

| | AAA Client <-> AAAh | AAAh <-> (AAAv) <-> DHCP Server |
|---|---|---|
| (i) | AAA (Diameter) DHCP Application | AAA (Diameter) DHCP Application |
| (ii) | Extended Authentication Protocol Application (e.g. Diameter/EAP/DHCP) | AAA (Diameter) DHCP |
| (iii) | Extended Authentication Protocol (e.g. Diameter/EAP/DHCP) | Extended Authentication (e.g. Diameter/EAP/DHCP) |

The combination (iii) is especially applicable for the case where the DHCP server is located in the home network. When the DHCP server is located in the visited network, the AAAv may be involved in the selection of DHCP server based on visited network policy.

For an extended authentication protocol such as EAP, the DHCP-related authentication and authorization information is preferably transferred concurrently in the same EAP round trip.

Figure 5:
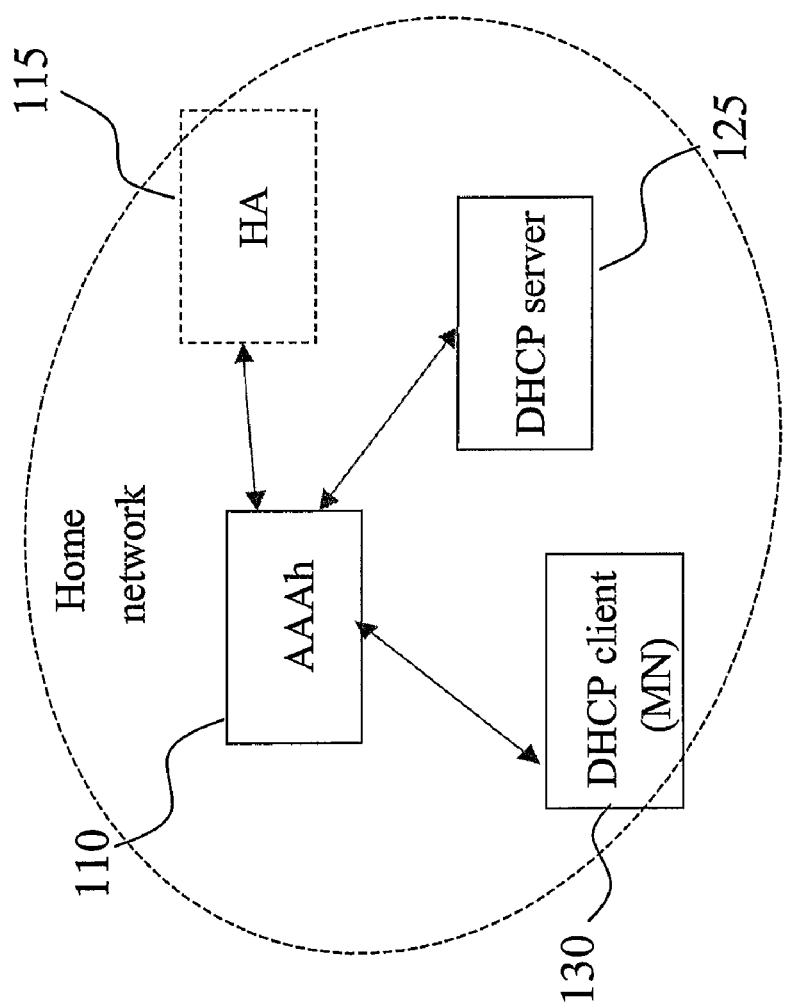
FIG. 5 is a schematic diagram illustrating a novel architecture for DHCP support for a DHCP client operating in its own home network according to an exemplary embodiment of the invention.

In another scenario, illustrated schematically in FIG. 5, the mobile DHCP client 130 is actually located in the home network and an AAA infrastructure component of the home network such as the AAAh server 110 provides the necessary support for the DHCP service with a DHCP server 125 in the home network. This means that only the relevant portions of the extended authentication DHCP protocol and/or AAA DHCP application have to be used for exchange of the necessary authentication and authorization information.

Figure 6:
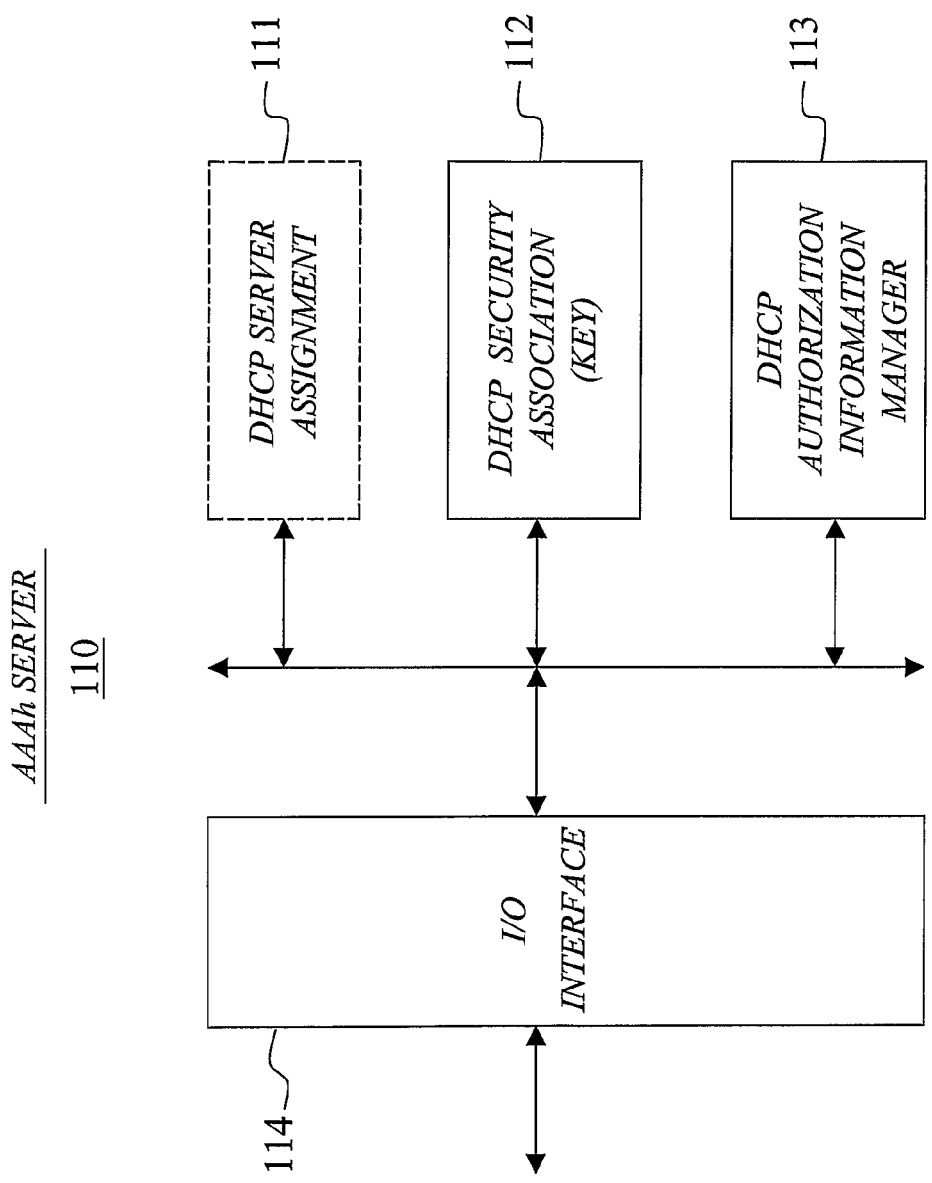
FIG. 6 is a schematic block diagram of an AAA home network server according to a preferred exemplary embodiment of the invention.

FIG. 6 is a schematic block diagram of an AAA home network server according to a preferred exemplary embodiment of the invention. In this example, the AAAh server 110 basically comprises an optional DHCP server assignment module 111, a DHCP security association module 112, a DHCP authorization information manager 113 and an input-output (I/O) interface 114. For the DHCP server in the home network case, the AAAh server 110 involves the DHCP server assignment module 111, which is operable for assigning and/or re-assigning a suitable DHCP server to the mobile host. For the DHCP server in the visited network case, the AAAh server 110 typically receives the necessary DHCP server assignment information from the AAAv on its I/O-interface 114. The AAAh server typically also receives a key seed or nonce from the mobile host. Alternatively, the AAAh server generates the key seed itself and sends it to the mobile host. The DHCP security association module 112 preferably generates the required security key in response to the seed, and securely transfers this key to the DHCP server (directly to a DHCP server in the home network or via the AAAv server to a DHCP server in the visited network). The AAAh server 110 stores relevant authorization information in the authorization information manager 113. The AAAh server may also receive information, such as IPSec information, from the DHCP server for finalizing the DHCP security association. Finally, the collected DHCP authorization information is transferred to the mobile host over the AAA infrastructure.

The AAAh server may also be responsible for home address assignment (unless the home address is configured by the MN itself) and/or home agent (HA) assignment.

For a better understanding of the invention, more detailed examples of an extended authentication protocol for DHCP and an AAA framework protocol application adapted for DHCP will now be described.

Extended Authentication Protocol for DHCP

In a preferred exemplary embodiment, an extended authentication protocol for DHCP, here exemplified by a new or extended EAP authentication protocol (referred to as "DHCP authentication method" or "EAP/DHCP"), is defined that carries DHCP related information facilitating for example bootstrapping of DHCP authentication extension (RFC3118), i.e., DHCP SA request, key generation nonce, key ID, and so forth. EAP/DHCP can also facilitate assignment of appropriate DHCP servers which can be located at either home or visited network, by transporting the necessary DHCP server IP address to the DHCP client.

The use of EAP or EAP-like protocols allows the AAA Client (and AAAv and other network components in the visited network) to be agnostic to RFC3118 procedures (i.e., this removes dependency on RFC3118 support of the visited network), and act as mere pass-through agent(s); which is one of the major advantages of using a transparent end-to-end protocol such as EAP.

As previously indicated, EAP/DHCP may for example be carried by PANA, PPP, ICMP, IEEE 802.1x or even over GPRS/UMTS interfaces between the mobile host (MN) and the AAA client in the visited network. Although, PANA may be preferred in some cases, other carrier protocols which satisfy EAP requirements on lower layer ordering guarantees such as PPP [7] and IEEE 802.1X [8] may be used to carry EAP/DHCP between the MN and AAA Client. Specifically for the 3GPP2 CDMA2000 case, it is possible to carry EAP/DHCP between the MN and AAA Client using PPP Data Link Layer protocol encapsulation with protocol field value set to C227 (Hex) for EAP [7].

A preferred embodiment uses Diameter, Radius or similar AAA framework or carrier protocol for lower-layer communication between the AAA client and the AAAh server. For example, beyond the AAA client towards and within the AAA infrastructure, a Diameter EAP Application [9] may be used to encapsulate EAP/DHCP within Diameter, i.e. between the PAA/AAA Client and AAAh. The Diameter protocol may also be used by AAAh for distribution of security keys to PAA/AAA client for PANA security, and optional signaling of QoS parameters.

It should be noted that even though Diameter is the preferred choice, it may sometimes be appropriate to use another AAA protocol, such as Radius, with modifications obvious to the man skilled in the art.

Exemplary EAP/DHCP Protocol Details

In the following, exemplary EAP/DHCP protocol details are provided to show examples of the overall flow and viability of concept.

EAP TLV Attributes

In a first realization example, a set of new EAP Type Length Values (TLVs) or similar attributes are preferably defined that would carry information that facilitate the bootstrapping of DHCP authentication extension (RFC3118), i.e., DHCP SA request, key generation nonce, key ID, etc and facilitate assignment of appropriate DHCP servers (DHCP server IP address).

Different authentication schemes are possible for EAP/DHCP. In a preferred embodiment, the invention proposes implementation through MD5-challenge authentication, but other schemes also lie within the scope of the invention.

One or more of the following exemplary EAP-TLV attributes may be defined for DHCP purposes:

DHCP Server Address Request EAP-TLV Attribute:

This represents a request for an address of a dynamically allocated DHCP server for the MN when successfully authenticated. It will typically be requested by the MN to the AAAh when a MN requests to be authenticated and given DHCP service.

The DHCP server assignment request may alternatively be implicit in other DHCP requests.

DHCP Server Address Response EAP-TLV Attribute:

This represents an address of a dynamic allocated DHCP server for the authenticated MN. It will be notified to the MN from the AAAh when a MN has been authenticated and dynamically assigned a DHCP server.

DHCP Server-MN (Pre-Shared) Key Generation Nonce EAP-TLV Attribute:

This represents the octet string generated randomly by MN as a seed for generating the pre-shared key between DHCP server and MN. The MN can internally generate the DHCP server-MN (pre-shared) key by using an appropriate hash algorithm on the combination of this nonce and the shared key between MN and AAAh. This attribute is optional when a valid DHCP server-MN (pre-shared) key already exists.

DHCP Server-MN (Pre-Shared) Key EAP-TLV Attribute:

This represents a dynamically generated (pre-shared) key between DHCP server and MN. It will typically be notified to the DHCP server from the AAAh. The AAAh can internally generate the DHCP server-MN (pre-shared) key by using an appropriate hash algorithm on the combination of the nonce given by the DHCP server-MN (Pre-Shared) Key Generation Nonce EAP-TLV Attribute and the shared key between MN and AAAh. This attribute is optional when a valid DHCP server-MN pre-shared key already exists.

DHCP Server IKE Key ID EAP-TLV Attribute:

This represents the ID payload defined in [10]. The KeyID is generated by the AAAh and sent to the MN upon successful authentication. The KeyID includes some octets which informs the DHCP server how to retrieve (or generate) the DHCP server-MN pre-shared key from AAAh. This attribute is optional, and would generally not be needed when the MN did not submit a DHCP server-MN pre-shared key generation nonce, i.e., a valid DHCP server-MN pre-shared key already exists. It is also not needed for the case when the DHCP server-MN pre-shared key is conveyed by the AAAh to the DHCP server.

DHCP Server-MN IPSec SPI EAP-TLV Attribute:

This represents the Security Parameter Index for IPSec between DHCP server and MN. This is preferably generated by the DHCP server and informed to the MN for the case when the DHCP server-MN pre-shared key is conveyed by the AAAh to the DHCP server. This attribute is optional and is generally not needed when the MN did not submit a DHCP server-MN pre-shared key generation nonce, i.e. a valid DHCP server-MN pre-shared key already exists.

DHCP Server-MN IPSec Protocol EAP-TLV Attribute:

This represents the IPSec Protocol (e.g. ESP or AH) between DHCP server and MN. This is informed to the MN for the case when the DHCP server-MN (pre-shared) key is conveyed by the AAAh to the DHCP server. This attribute is optional and is generally not needed when the MN did not submit a DHCP server-MN pre-shared key generation nonce, i.e. a valid DHCP server-MN pre-shared key already exists.

DHCP Server-MN IPSec Crypto EAP-TLV Attribute:

This represents the Cryptographic Algorithm for IPSec between DHCP server and MN. This is informed to the MN for the case when the DHCP server-MN (pre-shared) key is conveyed by the AAAh to the DHCP server. This attribute is optional and is generally not needed when the MN did not submit a DHCP server-MN pre-shared key generation nonce, i.e. a valid DHCP server-MN pre-shared key already exists.

DHCP Server-MN IPSec Key Lifetime EAP-TLV Attribute:

This represents the Key Lifetime for IPSec between DHCP server and MN. This is informed to the MN for the case when the DHCP server-MN (pre-shared) key is conveyed by the AAAh to the DHCP server. This attribute is optional and is generally not needed when the MN did not submit a DHCP server-MN pre-shared key generation nonce, i.e. a valid DHCP server-MN pre-shared key already exists.

The following EAP-TLV attributes may be defined for authentication of the mobile DHCP client (MN):

MD5 Challenge EAP-TLV Attribute:

This represents the octet string generated randomly by the AAAh and sent to MN for MD5 challenge.

MD5 Response EAP-TLV Attribute:

This represents the octet string generated as a result of MD5 hash function with the shared secret key between AAAh and MN.

Finally, the following optional EAP-TLV attribute may be defined for distribution of security keys between PAC and PAA for PANA security:

PAC-PAA Pre-Shared Key Generation Nonce EAP-TLV Attribute:

This represents the octet string generated randomly by MN/PAC as a seed for generating the pre-shared key between PAC-PAA. The MN/PAC can internally generate the PAC-PAA pre-shared key by using an appropriate hash algorithm on the combination of this nonce and the shared key between MN and AAAh. This attribute is needed for PANA security.

Alternatively, the AAAh server may be configured for generating not only the MN-DHCP server security key but also the information required for finalizing the DHCP security association.

It will also be possible to merge for example EAP/DHCP and a so-called EAP/HMIPv6 and/or EAP/MIPv6 protocol into a single EAP session (i.e., EAP/DHCP+HMIPv6/MIPv6) by simply combining relevant TLVs from several EAP methodologies, when it is desirable to carry out both DHCP and HMIPv6/MIPv6 authentication and authorization simultaneously to shorten session setup time delays. EAP/HMIPv6 is then an EAP authentication protocol which carries HMIPv6 related information facilitating discovery of MAP (Mobility Anchor Point), dynamic allocation of DHCP server, dynamic allocation of RCoA, distribution of security keys between MN and MAP, and/or possible piggyback of HMIPv6 mobility procedures. EAP/HMIPv6 defines in addition, new HMIP-specific Type-Length-Values (TLVs). A suitable EAP carrier such as the Diameter EAP Application can then transport EAP/DHCP within the AAA infrastructure. Correspondingly, EAP/MIPv6 is an EAP authentication protocol which carries MIPv6 related information including MIPv6 authentication and authorization information.

Reference [15] describes an EAP authorization phase that is chained after an EAP authentication phase in an EAP framework for allowing an EAP server to request authorization for session parameters from an EAP peer (e.g. a mobile client). The approach suggested in [15] is completely contrary to the scenario envisioned for DHCP, MIPv6 and/or HMIPv6, since the EAP server is the one asking for authorization from the EAP peer. Authorization of the EAP server from the peer side can for example be used for billing purposes when the network side needs authorization by the user (the consent of the user) to charge for a service. On the contrary, in DHCP, MIPv6 and HMIPv6, the client asks the network side for authorization to be able to use the DHCP, MIPv6 and/or HMIPv6 service.

EAP Generic Container Attribute (EAP GCA)

In an alternative EAP realization, EAP is used as a carrier of DHCP-related information (optionally also HMIPv6/MIPv6 information) without creating a new so-called EAP method, but rather by carrying the information in a generic container EAP attribute that can be used together with any EAP method.

In this exemplary realization, which builds on AAA support in the access network, EAP is augmented with a generic container attribute that can be used to carry any (assumedly non-EAP related) data, including e.g. DHCP-specific data and optionally also HMIPv6/MIPv6-specific data (if HMIPv6/MIPv6 bootstrapping is also desired). This allows the MN and the AAAh to communicate in a manner that is transparent to the visited domain, including the access network, the AAA client and the AAAv. EAP is preferably carried in an AAA protocol, e.g. the Diameter EAP Application or even RADIUS [11], [12], between the AAA client and the AAAh.

This new attribute should preferably be available for all EAP methods and can be included in any EAP message, including EAP Success/Failure messages. In this solution the new generic container attribute is used to convey DHCP-specific data between the MN and the AAAh. The solution may also include a Diameter or RADIUS application that is used to exchange AAA and relevant data between the AAAh and the HA.

In the following, a possible implementation of a generic container attribute (GCA) is discussed in terms of the current EAP protocol [13]. As stated, the generic container attribute should preferably be available to all methods and should be possible to include in any EAP message, including EAP Success/Failure messages. This implies that it should be a part of the EAP layer rather than the EAP method layer [13]. An important issue to consider is backward compatibility[1]. The use of the GCA in the given examples normally assumes that the new attribute is introduced in EAP in a manner that is backward compatible and transparent to the EAP authenticator. Introducing a GCA with these properties may require some special considerations, as will be discussed below.

[1] This refers to backward compatibility in terms of the MN and the EAP authenticator (typically located in the NAS). The MN and the EAP authentication server (i.e. the AAAh) are assumed to always be compatible.

For example, the format of the GCA could be a two-byte GCA length indicator followed by a GCA recipient indicator and a GCA payload. The GCA recipient indicator would indicate to what internal entity the EAP module should send the payload of the received GCA (i.e. this indicator would correspond to the protocol/next header field in the IP header or the port number in the UDP and TCP headers). The GCA payload would then be a generic chunk of data that is not interpreted by the EAP layer. The absence of a GCA would preferably be indicated by a GCA length indicator set to zero.

To provide backward compatibility the GCA should preferably be included in the EAP packets in a way that is transparent to pass-through EAP authenticators. A pass-through EAP authenticator is an EAP authenticator (residing in an NAS; typically a WLAN AP or an access router) that relays (almost all) EAP packets between the MN and a back-end EAP authentication server (an AAA server). It is stated in [13] that the pass-through behavior of an EAP authenticator is to relay EAP packets based on the EAP layer header, i.e. the Code, Identifier and Length fields in the beginning of the EAP packets. This implies that the desired transparency (and hence backward compatibility) could possibly be achieved if the GCA is placed after the EAP layer header (i.e. after the Code, Identifier and Length fields).

However, an EAP authenticator normally also has to check the Type field (following the EAP layer header) of EAP Response packets in order to identify EAP Identity Response packets, from which the NAI that is needed for the AAA routing is extracted. When the EAP authenticator identifies an EAP Identity Response packet, it extracts the NAI from the Type-Data field following the Type field. Hence, placing the GCA immediately after the EAP layer header (in a manner that is transparent to the EAP authenticator) is only possible in EAP Request packets. Therefore, it would normally be preferable to arrange the GCA after the Type field or even after the (possibly NULL-terminated) Type-Data field.

Placing the GCA immediately after the Type field would enable the use of the GCA in all EAP Response packets but EAP Identity Response packets. The use of the GCA in EAP Identity Response packets would be prohibited, because from these packets the EAP authenticator needs to extract the NAI from the Type-Data field, which a legacy EAP authenticator would expect to find immediately after the Type field. This may be a restriction for the GCA usage considering that EAP normally has rather few round trips. Possibly, the GCA could be placed after a NULL-terminated Type-Data field in the EAP Identity Response packet, while keeping its position after the Type field in other EAP packets.

It would often be desirable with a GCA position that can be used consistently in all EAP packets. From the above discussion it seems that a position in which the GCA could be placed in all EAP packets in a backward-compatible manner is at the end of the packet, more or less as a trailer. However, this GCA location may cause problems for those EAP packets that do not have explicit length indicators for the Type-Data parameter(s), but relies on the Length field in the EAP layer header. In these packets it would not be able to distinguish the GCA from the Type-Data field.

To solve this problem the order of the GCA length indicator, the GCA recipient indicator and the GCA payload should preferably be reversed such that the GCA length indicator appears last. Thus, when placing the GCA at the end of an EAP packet, the last two octets of the EAP packet (whose length is indicated by the Length field in the EAP layer header) would always be the GCA length indicator. Unless the GCA length indicator is zero, the GCA recipient indicator would appear before the GCA length indicator and the GCA payload (whose size is determined from the GCA length indicator) would be located before the GCA recipient indicator. Through this principle it would always be possible to identify the GCA in an EAP packet and to distinguish the GCA from the Type-Data field. Still the use of the GCA would be transparent for a pass-through EAP authenticator.

Typically, backward compatibility with this GCA solution may further require that the EAP authenticator does not try to extract information from the EAP Request/Response packets (except the EAP layer header and the NAI) and that it accepts that the Length field in the Success/Failure packets indicates a value is greater than 4.

An alternative way to cope with the backward compatibility problem is to use EAP GCA Test Request/Response packets (i.e. new EAP packets with newly defined values of the Type field) to determine whether the MN supports the GCA.

Before or after the initial EAP Identity Request/Response packet exchange an EAP authenticator supporting the GCA would send an EAP GCA Test Request packet (i.e. an EAP Request packet with a dedicated Type value) to the MN (the EAP peer state machine in [14] indicates that both alternative sending times would be feasible). If the MN supports the GCA, it responds with an EAP GCA Test Response packet. Otherwise the MN interprets the EAP GCA Test Request packet as a request to use an unknown EAP method and therefore the MN responds with an EAP Nak packet. From the response from the MN the EAP authenticator can determine whether the MN supports the GCA.

An MN supporting GCA can determine whether the EAP authenticator supports the GCA from the presence or absence of the EAP GCA Test Request packet. If an EAP GCA Test Request packet is received when expected (i.e. before or after the EAP Identity Request/Response exchange), the EAP authenticator supports the GCA. Otherwise it does not.

If both the MN and the EAP authenticator support the GCA, it may be placed after the EAP layer header in all subsequent EAP packets (with the original order of the GCA components). Otherwise, the GCA may still be included in the EAP packets that allow it to be included in a backward-compatible manner (as described above).

There are some limitations to the described alternative way of dealing with the backward compatibility problem. Firstly, one MN-EAP authenticator roundtrip is wasted. Moreover, if the EAP GCA Test Request/Response packets are exchanged after the initial EAP Identity Request/Response packet exchange, the GCA cannot be used in the EAP Identity Response packet. This embodiment may perhaps also require that the EAP authenticator (probably the NAS) uses a modified version of EAP, such as EAPv2.

Accordingly, although other alternatives are possible, the preferred way of arranging the GCA in EAP packets would typically be as a trailer at the end of the packet with the GCA length indicator last, after the GCA payload and the GCA recipient indicator.

If the number of EAP round trips is not enough for the data that is exchanged in the GCAs, the AAAh may consider increasing the number of EAP round trips through EAP Notification Request/Response exchanges for the purpose of conveying the GCA.

Another variant is actually to introduce the GCA in an EAP method on the method layer of the EAP protocol stack. If the GCA is made EAP method specific, the GCA does not introduce any backward compatibility problem, since it will then normally be a part of the Type-Data field.

Exemplary Signaling Flows for EAP/DHCP

Figure 7:
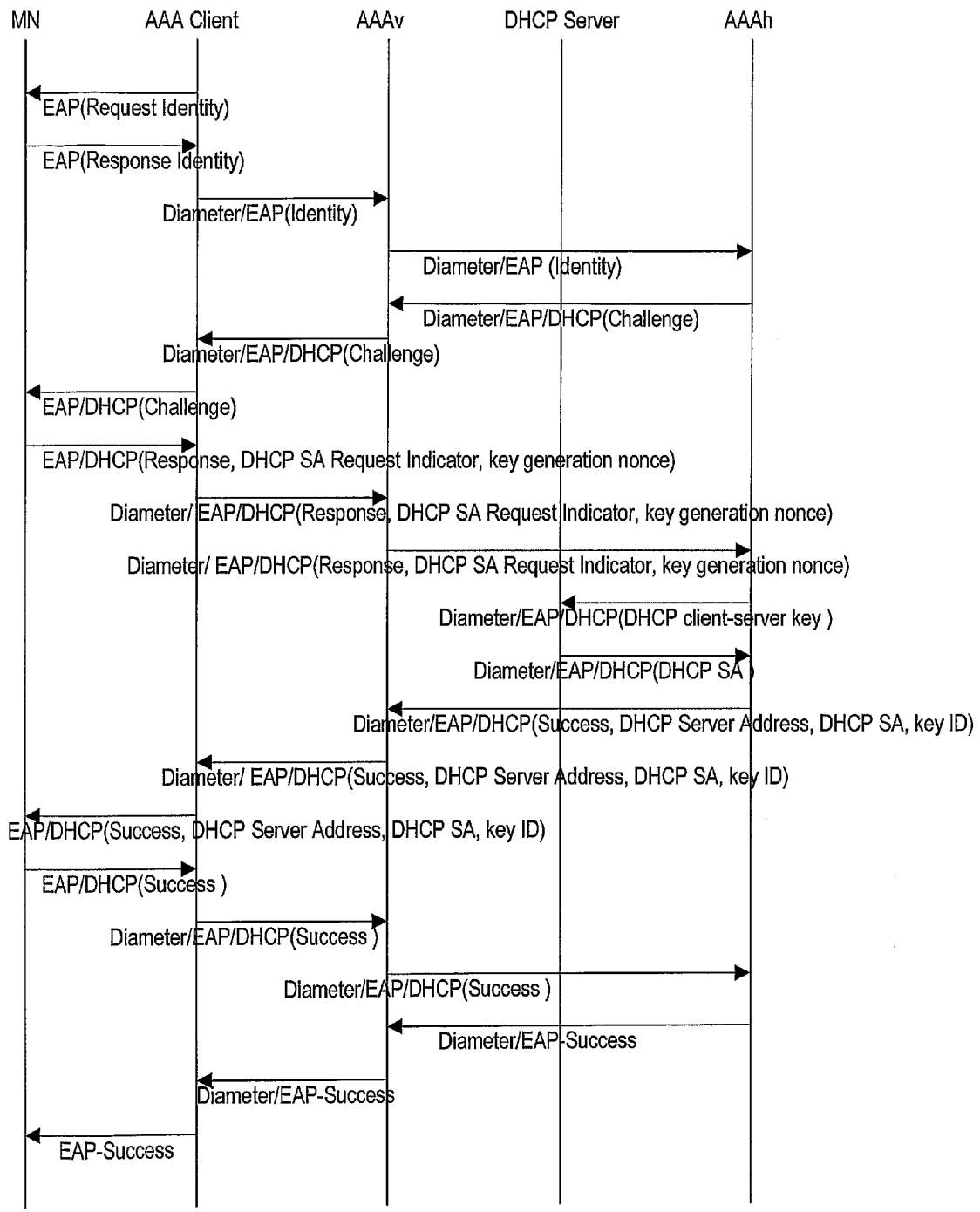
FIG. 7 illustrates an exemplary signaling flow for DHCP AAA using Diameter/EAP/DHCP for the case when the DHCP server is located in the home network.

FIG. 7 illustrates an exemplary EAP/DHCP (e.g. carried by Diameter) signaling flow for the case when the assigned DHCP server is located in the home network.

The AAA Client requests MN authentication using EAP (Request Identity), and the MN responds with EAP (Response Identity).

The MN response is sent to the AAAh via the AAA infrastructure. The AAAh determines from the identity of the MN and based on operator policy that EAP/DHCP methodology is appropriate for authentication and authorization of the MN (i.e. the AAAh knows the capabilities of the MN). The AAAh sends an indication of the suggested EAP methodology (e.g. EAP/DHCP) along with a challenge to the MN via the AAA infrastructure. The indication of EAP methodology or scheme may be implemented by assigning a new EAP Type number for the extended EAP scheme (e.g. EAP/DHCP). In this way, the mobile host will know which EAP scheme that the AAAh is proposing. Alternatively, a specially formatted challenge is sent to the mobile host, which recognizes that the challenge indicates a given EAP scheme.

The MN desires to bootstrap DHCP support, and replies to the AAAh suggestion and challenge with a challenge response as well as appropriate EAP attributes (TLVs) that convey a request to be assigned an appropriate DHCP server, preferably along with the necessary information for security association with the assigned DHCP server. In this process, the MN is also able, if desired, to request bootstrapping of HMIPv6/MIPv6 if this has not yet been carried out previously. The MN response is sent to the AAAh via the AAA infrastructure. Although the DHCP server assignment request may in fact be implicit, it is normally recommendable to make use of an explicit DHCP server assignment request. For cases where the mobile host is already aware of the DHCP server address and may e.g. simply be renewing the security association with the DHCP server, there will be no DHCP server assignment request, but only re-authentication and/or reauthorization.

The AAAh validates the MN's challenge response and if successful this means that the MN is authentic, and the AAAh then proceeds to process the MN's other requests.

First, the AAAh selects a DHCP server in the home network, and sends the selected DHCP server an enhanced EAP (note that this is typically a separate EAP session than the one already ongoing between the MN and the AAAh) message comprising e.g. the DHCP client-server security key(s), and the DHCP server responds to the AAAh, preferably by providing information, if required or otherwise appropriate, for finalizing the DHCP security association with the MN. For example, for IPSec security associations it may be necessary to make use of EAP attributes such as the IPSec Protocol, IPSec Crypto, IPSec Key Lifetime EAP TLV attributes defined above.

In this and the following illustrative examples, it is assumed that the mobile host (MN) and the AAAh have a common shared secret. This could for example be a symmetric key shared between the identity module installed in the mobile host and the home network operator. The identity module can be any tamper-resistant identity module known to the art, including standard SIM cards used in GSM (Global System for Mobile Communications) mobile telephones, Universal SIM (USIM), WAP (Wireless Application Protocol) SIM, also known as WIM, ISIM (IP Multimedia Subsystem Identity Module) and, more generally, UICC (Universal Integrated Circuit Card) modules. For the MN-DHCP server security association, a seed or nonce can be conveyed by the MN to the AAAh (or the other way around, i.e. the seed is originated by the AAAh and conveyed to the MN) from which the AAAh can create the MN-DHCP server security key(s) based on the shared secret. The mobile host is able to generate the same security key(s) by itself since it originated the seed/nonce (or receives the seed from the AAAh) and also has the shared secret. Alternatively, the AAAh may itself generate the security information and securely transfer it to the relevant nodes.

Secondly, if HMIPv6/MIPv6 bootstrapping is also requested, the AAAh proceeds to service this HMIPv6/MIPv6 bootstrapping request by selecting a Mobility Anchor Point (MAP)/Home Agent (HA) using additional enhanced EAP session(s), and the MAP/HA responds to the AAAh by providing information (not shown) necessary to create the HMIPv6/MIPv6 security association with the MN. Optionally, it is possible to piggyback "MAP binding updates" as well as "HA binding updates" in the authentication and authorization exchanges.

After the AAAh has communicated with the DHCP server (and MAP/HA) as described above, the AAAh sends the authorization information such as DHCP server address, (MAP address, RCoA, HA address, and MN home address), and security association information along with an authentication success indication back to the MN via extended EAP.

The extra last round trip of exchanges in FIG. 7 is to ensure that the EAP protocol is concluded smoothly according to the current EAP protocol specification.

Figure 8:
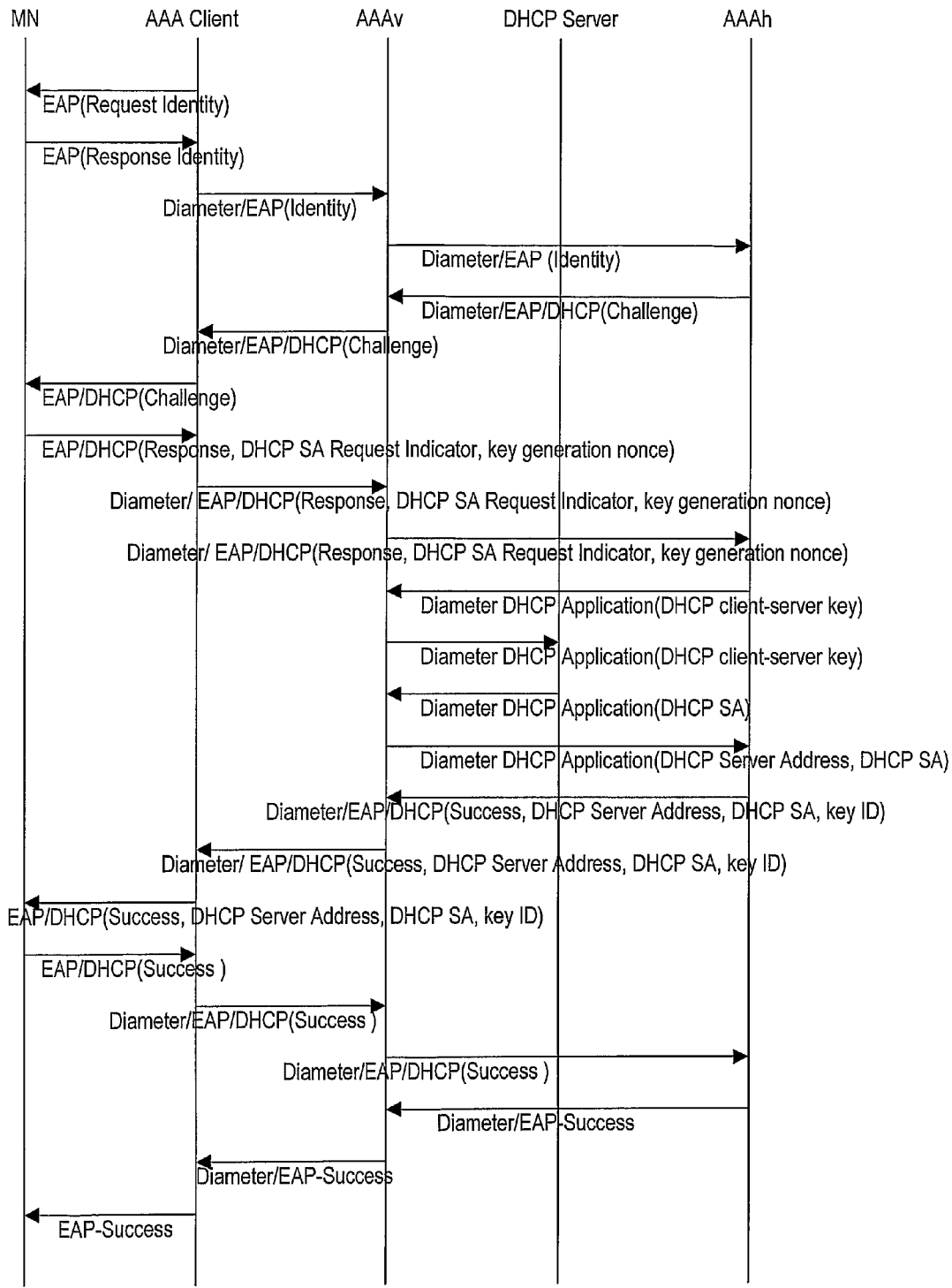
FIG. 8 illustrates an exemplary signaling flow for DHCP AAA using Diameter/EAP/DHCP in combination with a Diameter DHCP Application for the case when the DHCP server is located in the visited network.

FIG. 8 illustrates an exemplary EAP/DHCP (Diameter) signaling flow for the case when DHCP server is located in the visited network.

The AAA Client requests MN authentication using EAP (Request Identity), and the MN responds with EAP (Response Identity).

The MN response is sent to the AAAh via the AAA infrastructure. The AAAh determines from the identity of the MN and based on operator policy that EAP/DHCP methodology is appropriate for authentication and authorization of the MN (i.e. the AAAh knows the capabilities of the MN). The AAAh sends an indication of the suggested EAP methodology (i.e. EAP/DHCP) along with a challenge to the MN via the AAA infrastructure.

The MN desires to bootstrap DHCP authentication and authorization support, and replies to the AAAh suggestion and challenge with a challenge response as well as appropriate EAP attributes (e.g. TLVs) that convey a request to be assigned an appropriate DHCP server along with the necessary details for DHCP security association with the assigned DHCP server. The MN is also in the process able, if desired, to request bootstrapping of HMIPv6/MIPv6 if this has not yet been carried out previously. The MN response is sent to the AAAh via the AAA infrastructure.

The AAAh validates the MN's challenge response and if successful this means that the MN is authentic, and the AAAh proceeds to process the MN's requests.

First, the AAAh preferably generates a DHCP client-server key and forwards this key together with a request for assignment of a DHCP server in the visited network to the appropriate AAAv. This is preferably done via a Diameter application, which for simplicity has been called Diameter DHCP Application. The reason for this is that the visited operator's policy is normally taken into account in the selection of DHCP server in the visited network, and the AAAv thus needs to be able to see the transaction.

The AAAv selects a DHCP server in the visited network, and forwards a Diameter DHCP Application message containing e.g. the DHCP security key(s) to the DHCP server. The DHCP server responds to the AAAv, preferably by providing information, if required or otherwise appropriate, for finalizing the DHCP security association with the MN. The AAAv transfers the network address of the assigned DHCP server and security association information to the AAAh.

Secondly, the AAAh proceeds to service the HMIPv6/MIPv6 bootstrapping request, if such a request is present, by selecting a MAP/HA using additional enhanced EAP session(s), and the MAP/HA responds to the AAAh by providing information (not shown) necessary to create the HMIPv6/MIPv6 security association with the MN. Note that it is possible to piggyback "MAP binding updates" as well as "HA binding updates" in the authentication and authorization exchanges.

After the AAAh has communicated with the DHCP server (and MAP/HA) as described above, the AAAh sends the authorization information such as DHCP server address, (MAP address, RCoA, HA address, MN home address) and security association information along with an authentication success indication back to the MN via extended EAP.

The extra last round trip of exchanges in FIG. 8 is to ensure that the extended EAP protocol is concluded smoothly according to the current EAP protocol specification.

Although some of the detailed exemplary embodiments have primarily been discussed with reference to the current EAP version, it should be understood that the invention very well is applicable to other EAP versions, such as EAPv2, as well as other authentication protocols extended or configured in the described manner. EAP is merely an example of a possible implementation, and the invention is generally not limited thereto and may alternatively involve non-EAP schemes.

AAA Framework Protocol Application for DHCP

In another exemplary embodiment, a new AAA framework protocol application, here exemplified by a Diameter Application adapted for DHCP (referred to as "Diameter DHCP Application"), is created that carries DHCP-related information facilitating for example the bootstrapping of DHCP authentication extension (RFC3118), i.e., DHCP SA request, key generation nonce, key ID, etc. on the Diameter protocol level. Diameter DHCP Application also facilitates assignment of appropriate DHCP servers which can be located at either home or visited network, by transporting the necessary DHCP server IP address to the DHCP client.

Although Diameter is referred to in the following, it should be understood that Radius or other similar AAA framework protocol can be used as a basis for a new or extended AAA DHCP application.

If desired, both DHCP and HMIPv6/MIPv6 authentication and/or authorization can be integrated in the same AAA framework protocol application. This can be accomplished by adding to a Diameter DHCP application, the command codes, AVPs and/or flags from the Diameter MIPv6 Application described in [3], and in addition defining HMIP-specific command codes, AVPs, and/or flags. It will thus be possible to accommodate simultaneous executions of both DHCP and HMIPv6/MIPv6 authentication and authorization in a single traversal which enables shorter setup times. It would also be possible to execute only DHCP authentication and authorization without the HMIPv6/MIPv6 counterpart and vice versa, depending on the particular need of the MN at a specific instance. This allows a single application, the Diameter DHCP Application, to be flexibly used on various use case scenarios.

Diameter DHCP Application Details

In the following, exemplary Diameter DHCP Application details are provided to show examples of the overall flow and viability of concept. New DHCP-specific command codes, AVPs (Attribute Value Pairs), and flags are preferably defined that would carry information that facilitate the bootstrapping of DHCP authentication extension (RFC3118), i.e., DHCP SA request, key generation nonce, key ID, etc. and/or facilitate assignment of appropriate DHCP servers (DHCP server IP address).

For additional information, the Internet draft [9] defines Command Codes and AVPs necessary to carry EAP packets between a Network Access Server (NAS) and a back-end authentication server.

Exemplary Signaling Flows for Diameter DHCP Application

Figure 9:
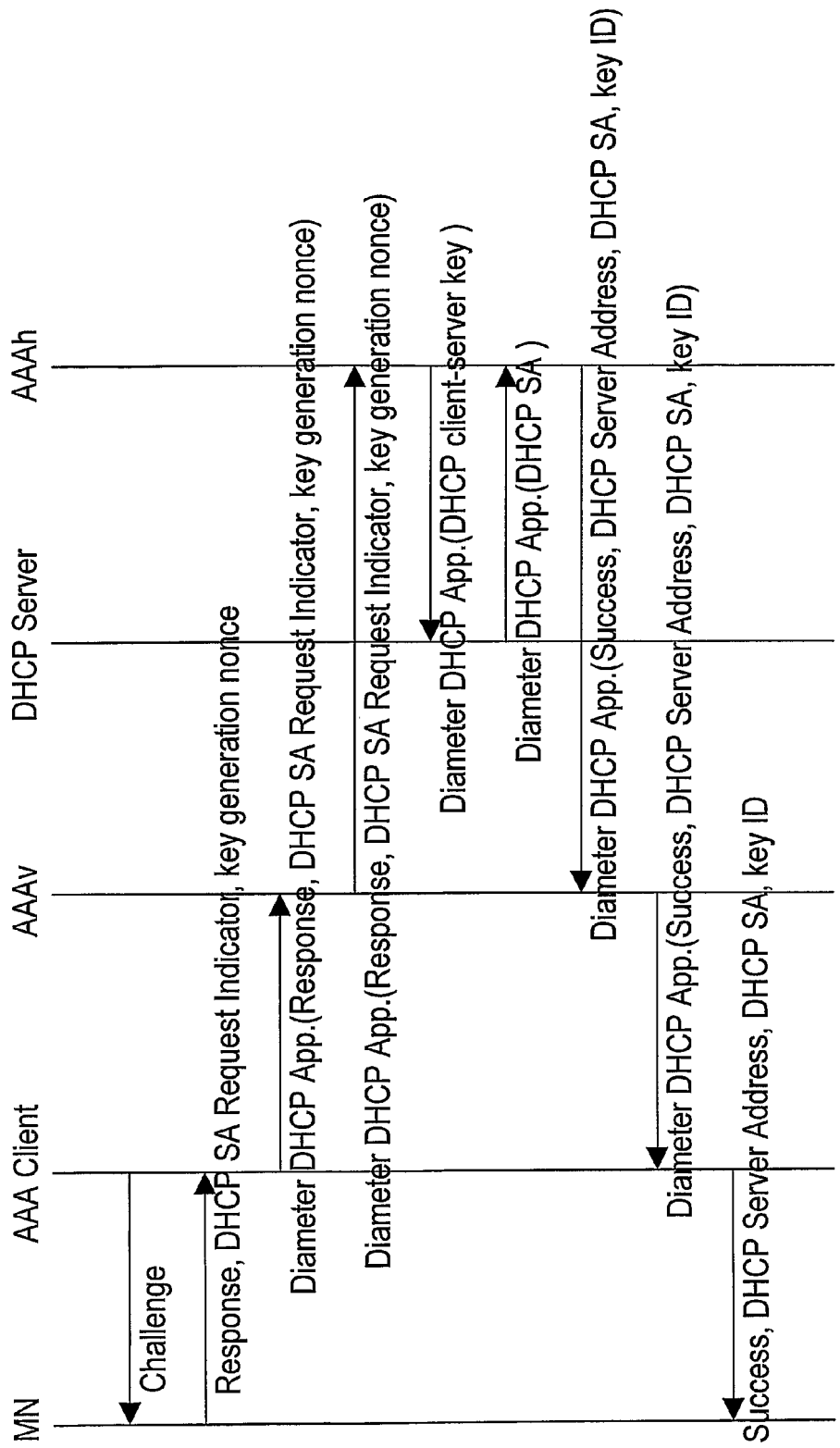
FIG. 9 illustrates an exemplary signaling flow for DHCP AAA using a Diameter DHCP Application for the case when the DHCP server is located in the home network.

FIG. 9 illustrates an exemplary Diameter DHCP Application signaling flow for the case when the DHCP server is located in the home network.

The AAA Client issues a challenge to the MN to be authenticated, for example via protocols such as the Internet Control Message Protocol (ICMP), PANA and so forth. The MN preferably responds with a challenge response along with a request for DHCP support, and a key nonce and possibly also HMIPv6/MIPv6 bootstrapping requests.

The AAA Client understands the DHCP support bootstrapping request, and forwards the MN response to the AAAh via the AAA infrastructure using a Diameter DHCP Application command code. In the process, the AAA Client also includes the challenge response to allow the AAAh to verify the authenticity of the MN.

The AAAh validates the MN's challenge response and if successful this means that the MN is authentic, and the AAAh then proceeds to process the MN's requests.

First, the AAAh selects a DHCP server in the home network, and sends the DHCP server an appropriate Diameter DHCP Application command code containing e.g. a generated DHCP security key, and the DHCP server responds to the AAAh, preferably by providing information, if required or otherwise appropriate, for finalizing the DHCP security association with the MN via a command code.

Secondly, if HMIPv6/MIPv6 bootstrapping is requested, the AAAh proceeds to service the HMIPv6/MIPv6 bootstrapping request by selecting a MAP/HA using a Diameter DHCP Application command code, and the MAP/HA responds to the AAAh by providing information necessary to create the HMIPv6/MIPv6 security association with the MN via a command code. Note that it is possible to piggyback "MAP binding updates" as well as "HA binding updates" in the authentication and authorization exchanges.

After the AAAh has communicated with the DHCP server (and MAP/HA) as described above, the AAAh sends the authorization information such as DHCP server address (MAP address, RCoA, HA address, MN home address) and security association information along with an authentication success indication back to the MN via a Diameter DHCP Application command code and for example ICMP, PANA and so forth.

Figure 10:
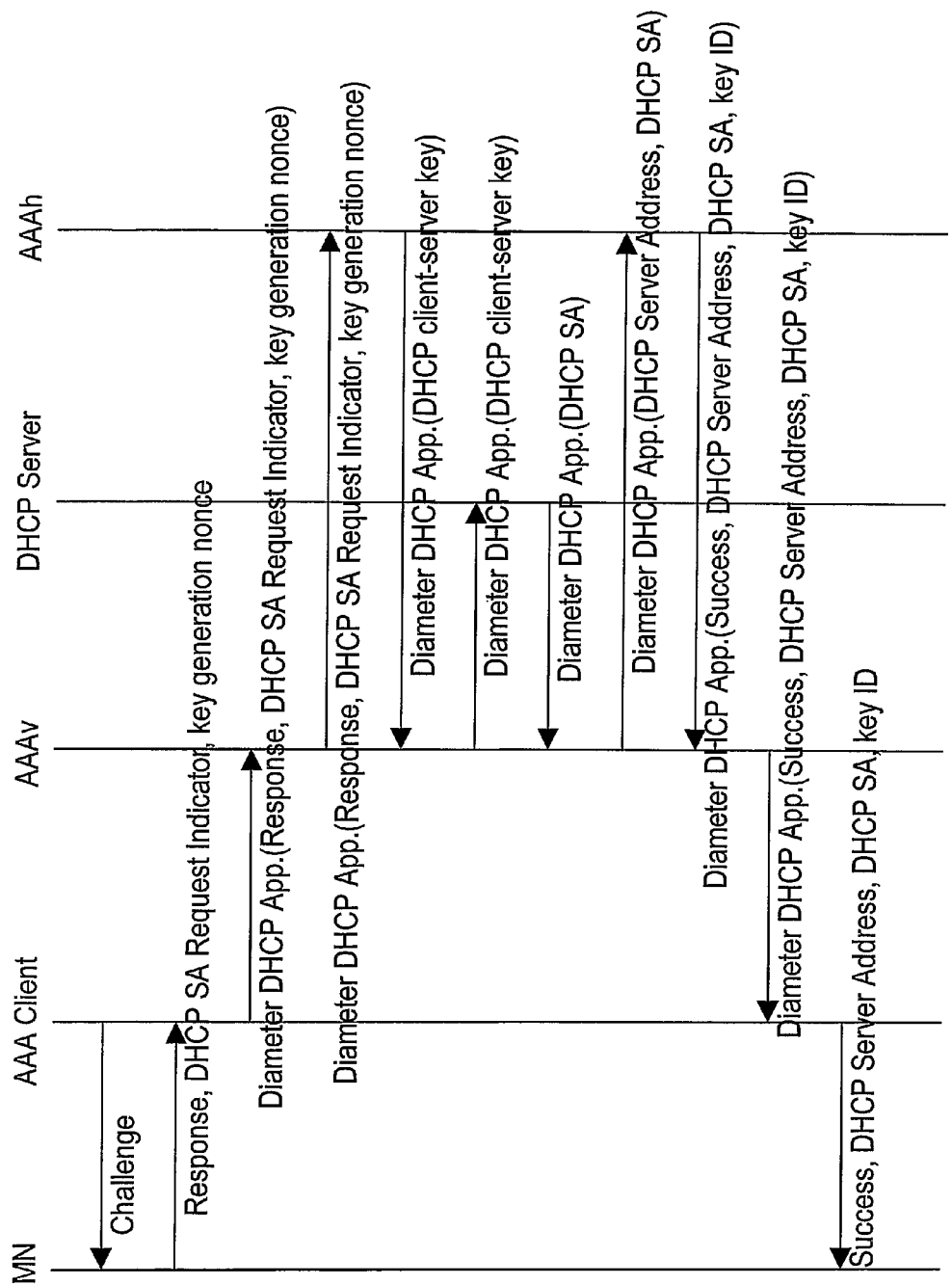
FIG. 10 illustrates an exemplary signaling flow for DHCP AAA using a Diameter DHCP Application for the case when the DHCP server is located in the visited network.

FIG. 10 illustrates an exemplary Diameter DHCP Application signaling flow for the case when the DHCP server is located in the visited network.

The AAA Client issues a challenge to the MN to be authenticated, for example via ICMP or PANA. The MN responds with a challenge response along with a request for DHCP support and possibly also HMIPv6/MIPv6 bootstrapping requests.

The AAA Client understands the DHCP bootstrapping request, and forwards the MN response to the AAAh via the AAA infrastructure using a Diameter DHCP Application command code. In the process, the AAA Client also includes the challenge response to allow the AAAh to verify the authenticity of the MN.

The AAAh validates the MN's challenge response and if successful this means that the MN is authentic, and the AAAh then proceeds to process the MN's requests.

First, the AAAh preferably generates a DHCP client-server key and forwards the key and a request for DHCP server in the visited network to the appropriate AAAv. This is done via a Diameter DHCP Application command code. The AAAv selects an appropriate DHCP server in the visited network, and forwards a command code that includes for example the DHCP security key to the DHCP server, and the DHCP server responds to the AAAh via the AAAv, preferably by providing information, if required or otherwise appropriate, for finalizing the security association with the MN using a command code.

Secondly, if requested, the AAAh proceeds to service the HMIPv6/MIPv6 bootstrapping request.

After the AAAh has communicated with the DHCP server (and MAP/HA) as described above, the AAAh sends the authorization information such as DHCP server address, (MAP address, RCoA, HA address, MN home address) and security association information along with an authentication success indication back to the MN via a Diameter DHCP Application command code and a protocol such as ICMP or PANA.

Among other application areas, the invention is applicable to all access networks such as WLAN, CDMA2000, WCDMA and so forth, where DHCP and optionally also HMIPv6/MIPv6 can be used, including technologies such as AAA, DHCP and IPv6 mobility, systems such as CMS11, WCDMA and GSM systems, sub-systems such as service/application subsystems and terminals, and products such as AAA servers, DHCP servers and terminal nodes.

The embodiments described above are merely given as examples, and it should be understood that the present invention is not limited thereto. Further modifications, changes and improvements which retain the basic underlying principles disclosed and claimed herein are within the scope of the invention.

ABBREVIATIONS

DHCP—Dynamic Host Configuration Protocol
EAP—Extensible Authentication Protocol
NAS—Network Access Server
SA—Security Association
AAA—Authentication Authorisation and Accounting
AAAh—Home AAA
AAAv—Visited AAA
AKA—Authentication Key Agreement
EAP—Extensible Authentication Protocol
EP—Enforcement Point
HA—Home Agent
IKE—Internet Key Exchange
IPSec—IP Security
ISAKMP—Internet Security Association and Key Management Protocol
MD5—Message Digest 5
MIPv6—Mobile IP version 6
MN—Mobile Node
PAA—PANA Authentication Agent
PAC—PANA Client
PANA—Protocol for carrying Authentication for Network Access
SPI—Security Parameters Index
TLS—Transport Layer Security
TLV—Type Length Value
TTLS—Tunneled TLS
WLAN—Wireless Local Area Network

REFERENCES

[1] Dynamic Host Configuration Protocol, RFC2131, R. Droms, March 1997.
[2] Authentication for DHCP Messages, RFC3118, R. Droms, W. Arbaugh, June 2001.
[3] Bootstrapping RFC3118 Delayed DHCP Authentication Using EAP-based Network Access Authentication, A. Yegin, H. Tschofenig, D. Forsberg, February 2004, <draft-yegin-eap-boot-rfc3118-00.txt>.
[4] Bootstrapping RFC3118 Delayed authentication using PANA, H. Tschofenig, A. Yegin, D. Forsberg, October 2003, <draft-tschofenig-pana-bootstrap-rfc3118-01.txt>.
[5] Diameter Mobile IPv6 Application, Stefano M. Faccin, Franck Le, Basavaraj Patil, Charles E. Perkins, April 2003, <draft-1e-aaa-diameter-mobileipv6-03.txt>.
[6] MIPv6 Authorization and Configuration based on EAP, G. Giaretta, I. Guardini, E. Demaria, February 2004, <draft-giaretta-mip6-authorization-eap-00.txt>.
[7] PPP Extensible Authentication Protocol (EAP), RFC2284, L. Blunk, J. Vollbrecht, March 1998.
[8] IEEE Standard 802.1x, Local and metropolitan area networks—Port-Based Network Access Control.

[9] Diameter Extensible Authentication Protocol (EAP) Application, P. Eronen, T. Hiller, G. Zorn, Feb. 16, 2004, <draft-ietf-aaa-eap-04.txt>.

[10] Internet Security Association and Key Management Protocol (ISAKMP), RFC2408, D. Maughan, M. Schertler, M. Schneider, J. Turner, November 1998.

[11] Remote Authentication Dial In User Service (RADIUS)—RFC2865, C. Rigney, S. Willens, A. Rubens, W. Simpson, June 2000.

[12] RADIUS Extensions—RFC2869, C. Rigney, W. Willats, P. Calhoun, June 2000.

[13] Extensible Authentication Protocol (EAP)—RFC2284, L. Blunk, J. Vollbrecht, B. Aboba, J. Carlson, H. Levkowetz, September 2003, <draft-ietf-eap-rfc2284bis-06.txt>.

[14] State Machines for EAP Peer and Authenticator, J. Vollbrecht, P. Eronen, N. Petroni, Y. Ohba, October 2003, <draft-ieff-eap-statemachine-01.pdf>.

[15] EAP Authorization, M. Grayson, J. Salowey, March 2003, <draft-grayson-eap-authorization-01.txt>.

The invention claimed is:

1. A method of supporting Dynamic Host Configuration Protocol (DHCP) service for a DHCP client, wherein the DHCP client is a mobile host roaming in a visited network, said method comprising the steps of:
an AAA visited network server (AAAv) assigning an appropriate DHCP server in the visited network to the DHCP client for the DHCP service based on a policy of a visited network operator; and
transferring DHCP-related information over an Authentication, Authorization, and Accounting (AAA) infrastructure for authenticating and authorizing the DHCP client for the DHCP service with the assigned DHCP server to establish a DHCP security association between the DHCP client and the DHCP server;
wherein:
the mobile host sends a DHCP assignment request to an AAA home network server (AAAh) over the AAA infrastructure,
the AAAh forwards the DHCP assignment request to the AAA visited network server (AAAv) for assignment of a DHCP server,
the AAA home network server generates credential-related data for security association between the mobile host and the assigned DHCP server, said credential-related data being transferred from the AAAh to the DHCP server via the AAAv,
the AAAh generates information for finalizing the security association, or the DHCP server responds with information for finalizing the security association to the AAAh via the AAAv, and
the AAAh sends DHCP authorization information including DHCP server assignment information, and DHCP security association information to the mobile host over the AAA infrastructure.

2. A method of supporting Dynamic Host Configuration Protocol (DHCP) service for a DHCP client, comprising the steps of:
an AAA server assigning an appropriate DHCP server to the DHCP client for the DHCP service; and
transferring DHCP-related information over an Authentication, Authorization, and Accounting (AAA) infrastructure for authenticating and authorizing the DHCP client for the DHCP service with the assigned DHCP server to establish a DHCP security association between the DHCP client and the DHCP server;
wherein:
the DHCP client is a mobile host,
an AAA component of a home network of the mobile host generates credential-related data for security association between the mobile host and the assigned DHCP server and sends said credential-related data to the DHCP server,
the AAA home network component generates information for finalizing the security association or the DHCP server responds with information for finalizing the security association to the AAA home network component, and
the AAA home network component sends DHCP authorization information including DHCP server assignment information, and DHCP security association information to the mobile host over the AAA infrastructure.

3. The method of claim 2, wherein the DHCP client is a mobile host roaming in a visited network, and DHCP-related authentication and authorization information is transferred between the mobile host and an AAA home network server (AAAh) within an authentication protocol in an end-to-end procedure transparent to the visited network.

4. The method of claim 2, further comprising simultaneously accommodating DHCP and HMIPv6/MIPv6 authentication and authorization in the same round trip over said AAA infrastructure.

5. An Authentication, Authorization, and Accounting (AAA) home network server (AAAh) for supporting Dynamic Host Configuration Protocol (DHCP) service for a mobile host, comprising:
a Security Association (SA) module for generating credential-related data for DHCP security association between the mobile host and a DHCP server assigned by a further AAA server; and
an Input/Output (I/O) interface in communication with the security association module for receiving the credential-related data from the SA module and sending the credential-related data to the assigned DHCP server, for receiving information from the DHCP server for finalizing the security association and sending the received information for finalizing the security association to the SA module, and for sending DHCP authorization information including DHCP security association information to the mobile host.

6. The AAA home network server of claim 5, wherein:
said AAAh is configured to receive DHCP server assignment information from the further AAA server,
said I/O interface is configured to send the DHCP server assignment information to the mobile host, and
said mobile host is roaming in a visited network, and said I/O interface is configured to send the DHCP authorization information over an AAA infrastructure linking the visited network with the home network of the mobile host.

7. A system for supporting Dynamic Host Configuration Protocol (DHCP) service for a mobile host roaming in a visited network, said system comprising:
an Authentication, Authorization, and Accounting (AAA) home network server (AAAh) configured to authenticate and authorize the mobile host for DHCP service;
an AAA infrastructure configured to transfer DHCP-related authentication and authorization information between the mobile host and the AAAh, wherein the AAA infrastructure includes pass-through nodes in the visited network that transfer the DHCP-related authentication and authorization information within an Extensible Authentication Protocol (EAP) in an end-to-end procedure transparent to the visited network; and an AAA visited network server (AAAv) configured to assign an appropriate DHCP server in the visited network to the mobile host for the DHCP service.

* * * * *

UNITED STATES PATENT AND TRADEMARK OFFICE
CERTIFICATE OF CORRECTION

| | |
|---|---|
| PATENT NO. | : 7,983,418 B2 |
| APPLICATION NO. | : 11/568013 |
| DATED | : July 19, 2011 |
| INVENTOR(S) | : Oyama et al. |

It is certified that error appears in the above-identified patent and that said Letters Patent is hereby corrected as shown below:

In Column 21, Line 18, delete "<draft-ieff" and insert -- <draft-ietf --, therefor.

Signed and Sealed this
Twenty-second Day of November, 2011

David J. Kappos
*Director of the United States Patent and Trademark Office*